(12) United States Patent
Kren et al.

(10) Patent No.: US 10,483,543 B2
(45) Date of Patent: Nov. 19, 2019

(54) LITHIUM ION CELL HAVING IMPROVED AGEING BEHAVIOR

(71) Applicant: VARTA Microbattery GmbH, Ellwangen Jagst (DE)

(72) Inventors: Harald Kren, Graz (AT); Stefan Koller, Graz (AT); Andrea Droisner, Bartholomä (AT)

(73) Assignee: VARTA Microbattery GmbH, Ellwangen Jagst (DE)

( * ) Notice: Subject to any disclaimer, the term of this patent is extended or adjusted under 35 U.S.C. 154(b) by 0 days.

(21) Appl. No.: 15/984,847

(22) Filed: May 21, 2018

(65) Prior Publication Data

US 2018/0358616 A1    Dec. 13, 2018

Related U.S. Application Data

(62) Division of application No. 13/885,192, filed as application No. PCT/EP2011/069915 on Nov. 11, 2011, now Pat. No. 10,003,074.

(30) Foreign Application Priority Data

Nov. 16, 2010    (DE) .................. 10 2010 044 008

(51) Int. Cl.
*H01M 4/583*    (2010.01)
*H01M 4/13*    (2010.01)
(Continued)

(52) U.S. Cl.
CPC ............. *H01M 4/583* (2013.01); *H01M 4/13* (2013.01); *H01M 4/58* (2013.01); *H01M 10/058* (2013.01);
(Continued)

(58) Field of Classification Search
CPC ........ H01M 4/583; H01M 4/13; H01M 4/131; H01M 4/134; H01M 4/58; H01M 4/587
See application file for complete search history.

(56) References Cited

U.S. PATENT DOCUMENTS 6,589,696 B2    7/2003    Matsubara et al.
2003/0064282 A1    4/2003    Nakagawa et al.
(Continued)

FOREIGN PATENT DOCUMENTS

CN    1335651 A    2/2002
DE    697 07 622 T2    8/2002
(Continued)

OTHER PUBLICATIONS

Y. Takeda et al., "Lithium secondary batteries using a lithium cobalt nitride, $Li_{2.6}Co_{0.4}N$, as the anode," Solid State Ionics, vol. 130, 2000, pp. 61-69.
(Continued)

*Primary Examiner* — Osei K Amponsah
(74) *Attorney, Agent, or Firm* — DLA Piper LLP (US)

(57) ABSTRACT

A method of producing an electrochemical cell includes introducing lithium into the electrochemical cell such that an amount of mobile lithium contained in the cell available for incorporation and releasing processes in electrodes exceeds, after formation, the capacity of at least one positive electrode for taking up lithium at least by a factor of 1.1, and the at least one negative electrode in terms of its capacity for taking up lithium is dimensioned to a size sufficient to be capable of taking up the entire mobile lithium contained in the cell after formation, wherein the lithium is introduced at least partially into the electrochemical cell via the at least one negative electrode by pre-lithiating the at least one negative electrode prior to combination with the at least one
(Continued)

positive electrode or by applying metallic lithium on a surface of the at least one negative electrode.

9 Claims, 2 Drawing Sheets

(51) Int. Cl.
*H01M 4/58* (2010.01)
*H01M 10/0525* (2010.01)
*H01M 10/058* (2010.01)
*H01M 4/131* (2010.01)
*H01M 4/134* (2010.01)
*H01M 4/587* (2010.01)
*H01M 10/42* (2006.01)

(52) U.S. Cl.
CPC ........ *H01M 10/0525* (2013.01); *H01M 4/131* (2013.01); *H01M 4/134* (2013.01); *H01M 4/587* (2013.01); *H01M 2010/4292* (2013.01); *Y10T 29/49108* (2015.01)

(56) References Cited

U.S. PATENT DOCUMENTS

| | | |
|---|---|---|
| 2004/0175621 A1 | 9/2004 | Iriyama et al. |
| 2006/0194109 A1 | 8/2006 | Watanabe et al. |
| 2007/0202365 A1 | 8/2007 | Sawa et al. |
| 2007/0202406 A1 | 8/2007 | Takahashi et al. |
| 2007/0218359 A1 | 9/2007 | Shimizu et al. |
| 2008/0241647 A1 | 10/2008 | Fukui et al. |
| 2009/0136848 A1 | 5/2009 | Minami et al. |
| 2009/0202906 A1 | 8/2009 | Ugaji et al. |
| 2010/0233543 A1 | 9/2010 | Numata et al. |
| 2010/0239915 A1 | 9/2010 | Hochgatterer et al. |

FOREIGN PATENT DOCUMENTS

| | | |
|---|---|---|
| DE | 696 31 900 T2 | 8/2004 |
| EP | 1 655 793 A1 | 5/2006 |
| EP | 2 139 058 A1 | 12/2009 |
| JP | 2002-324585 A | 11/2002 |
| JP | 2003-115293 A | 4/2003 |
| JP | 2004-363076 A | 12/2004 |
| JP | 2008-192608 A | 8/2008 |
| JP | 2009-38036 A | 2/2009 |
| JP | 2009-059659 A | 3/2009 |
| JP | 2009-199761 A | 9/2009 |
| JP | 2011-54324 | 3/2011 |
| KR | 10-2008-0024597 | 3/2008 |
| WO | 00/65680 A1 | 11/2000 |
| WO | 2008/045557 A1 | 4/2008 |
| WO | 2008/143854 A1 | 11/2008 |
| WO | 2009/012899 A1 | 1/2009 |
| WO | 2009/029270 A1 | 3/2009 |

OTHER PUBLICATIONS

B.V. Ratnakumar et al., "Effects of SEI on the kinetics of lithium intercalation," Journal of Power Sources 97-98, 2001, pp. 137-139.

Doron Aurbach et al., "On the behavior of different types of graphite anodes," Journal of Power Sources 119-121, 2003, pp. 2-7.

Yu Liu et al., "Layered lithium transition metal nitrides as novel anodes for lithium secondary batteries," Electrochim ca Acta, vol. 49, 2004, pp. 3487-3496.

J. Vetter et al., "Ageing mechanisms in lithium-ion batteries," Journal of Power Sources, vol. 147, 2005, pp. 269-281.

LITHIUM ION CELL HAVING IMPROVED AGEING BEHAVIOR

TECHNICAL FIELD

This disclosure relates to a secondary electro-chemical cell, a battery including at least one such cell and a method of producing such a battery.

BACKGROUND

The term "battery" originally meant a plurality of electrochemical cells connected in series in a housing. However, single electrochemical cells are nowadays frequently also referred to as batteries. During the discharge of a battery, an energy-supplying chemical reaction made up to two electrically coupled, but physically separate subreactions takes place. One subreaction taking place at a comparatively low redox potential proceeds at the negative electrode, while a subreaction at a comparatively higher redox potential proceeds at the positive electrode. During discharge, electrons are liberated at the negative electrode by an oxidation process, resulting in flow of electrons via an external load to the positive electrode which takes up a corresponding quantity of electrons. A reduction process thus takes place at the positive electrode. At the same time, an ion current corresponding to the electrode reaction occurs within the cell. This ion current is achieved by an ion-conductive electrolyte. In secondary cells and batteries, this discharge reaction is reversible, and it is thus possible to reverse the transformation of chemical energy into electric energy which occurs during discharge. If the terms anode and cathode are used in this context, the electrodes are generally named according to their discharge function. In such cells, the negative electrode is thus the anode, and the positive electrode is the cathode.

The extractable charge of a cell, which depends on the discharge conditions to a great extent, is referred to as capacity (unit Ah). The specific charge (unit Ah/Kg) or charge density (unit Ah/L) is a measure for the number of electrons and/or ions liberated or received per unit mass or volume, and thus for the storage capacity of electrodes and batteries. Accordingly, in this context reference is made to the specific capacity of electrodes and batteries which is also indicated in the unit Ah/kg. A great potential difference between negative and positive electrode combined with electrode materials of high specific charge or charge density results in high values for the specific energy (unit Wh/kg) or the energy density (unit Wh/L). When operating a battery, the rates of electron transfer and ion transfer inside the battery, in particular the rate of ion transfer at the phase interfaces within the electrodes, limit the power. The relevant properties of batteries in this regard can be taken from the key figures specific power (unit W/kg) and power density (unit WA).

Among secondary cells and batteries, lithium ion batteries achieve comparatively high energy densities. These batteries generally have composite electrodes which comprise electrochemically active components together with electrochemically inactive components. Possible electrochemically active components (often also referred to as active materials) for lithium ion batteries are in principle all materials which can take up lithium ions and release them again. In this regard, concerning the negative electrode, in particular particles based on carbon such as graphitic carbon or non-graphitic carbon materials capable of intercalating lithium, are state of the art. Furthermore, also metallic or semi-metallic materials which can be alloyed with lithium can be used. For instance, the elements tin, antimony and silicon are capable of forming intermetallic phases with lithium. Concerning the positive electrode, industrially applied active materials at present comprise lithium cobalt oxide ($LiCoO_2$), $LiMn_2O_4$ spinel ($LiMn_2O$), lithium iron phosphate ($LiFePO_4$) as well as derivatives such as, for example, $LiNi_{1/3}Mn_{1/3}Co_{1/3}O_2$ or $LiMnPO4$. All electrochemically active materials are generally contained in the electrodes in the form of particles.

As electrochemically inactive components, mention may be made first and foremost of electrode binders and current collectors. Electrons are supplied to or discharged from the electrodes via current collectors. On the one hand, electrode binders ensure the mechanical stability of the electrodes and, on the other hand, the contacting of the particles made of electrochemically active material among themselves as well as to the current collector. Conductivity-improving additives, which can likewise be subsumed under the collective term "electrochemically inactive components" can contribute to improved electrical contact of the electrochemically active particles with the current collectors. All electrochemically inactive components should at least be electrochemically stable in the potential range of the respective electrode and should be further chemically inert towards common electrolyte solutions. Common electrolyte solutions are solutions of lithium salts such as lithium hexafluorophosphate, in organic solvents such as ethers and esters of carbonic acid.

The aforementioned carbon based active materials for the negative electrode allow reversible, specific capacities of up to ca. 372 Ah/kg. An even significantly greater storage capacity of up to 4200 Ah/kg is exhibited by the aforementioned metallic or semi-metallic materials that can be alloyed with lithium. In contrast, the capacities of the aforementioned cathode materials are only 110 Ah/kg to 250 Ah/kg. Therefore, attempts are made to balance the materials for the positive electrode and the negative electrode in terms of quantity to match the actual capacities of the electrodes in a most optimal way.

In this context, it is of particular importance that already during the first charge/discharge cycle of secondary lithium ion cells (the so-called "formation"), a cover layer is generated on the surface of the electrochemically active materials in the anode (see D. Aurbach, H. Teller, M. Koltypin, E. Levi, Journal of Power Sources 2003, 119-121, 2). The cover layer is referred to as "Solid Electrolyte Interphase" (SEI) and generally mainly consists of electrolyte decomposition products as well as of a certain amount of lithium which correspondingly is no longer available for further charge/discharge reactions. Ideally, the SEI is only permeable for extremely small lithium ions, and prevents further direct contact of the electrolyte solution with the electrochemically active material in the anode (see B. V. Ratnakumar, M. C. Smart, S. Surampudi, Journal of Power Sources 2001, 97-98, 137). To an extent, generation of the SEI has positive effects. However, the loss of mobile lithium due to SEI-generation has a negative impact. Usually, during the first charging process, there is a loss of approximately 10% to 35% of the mobile lithium depending on the type and the quality of the applied active material and electrolyte solution. The achievable capacity likewise decreases by that percentage. Those losses due to formation have to be considered when balancing the anode and the cathode.

During subsequent cycles, generally there are only slight lithium losses, respectively. However, upon a higher number of cycles, the small lithium losses sum up to an important, maybe even the most important parameter for cell aging (see J. Vetter, P. Novak, M. R. Wagner, C. Veit, K.-C. Möller, J. O. Besenhard, M. Winter, M. Wohlfahrt-Mehrens, C. Vogler, A. Hammouche, Journal of Power Sources, 2005, 269-281, 147). The thickness of the SEI layer on the surface of the electrochemically active materials is ever more increasing, frequently resulting in a significant increase of cell impedance. In addition, the increasing losses of mobile lithium have to be considered. The effects lead to a continuously progressing decrease in capacity and power of the affected cell. The cell thus ages.

The use of over-lithiated cathode materials in combination with anodes based on carbon materials can cause a reduction of that phenomena, however, to the detriment of safety, as the case may be. Whether there is a safety problem, depends on the ratio of maximum capacity of the anode to the capacity of the anode after the formation. For example, the maximum specific capacity of anodes on graphite basis is at 372 mAh/g. In the case of a 15% loss of mobile lithium due to SEI generation in the course of formation, it is thus theoretically possible to combine the anode with a cathode containing an amount of mobile lithium ions which corresponds to the equivalent of 372+15%~427 mAh/g. However, if the lithium loss during formation is less pronounced, an undesired deposition of metallic lithium at the anode can occur. The anodes of lithium ion batteries are generally over-dimensioned to prevent this.

Furthermore, it is problematic that lithiation of the aforementioned active materials is accompanied by a significant increase in volume. Thus, the volume of graphite particles can increase by up to 10% when taking up lithium ions. The volume increase is even greater in the case of the aforementioned metallic and semi-metallic storage materials. For example, when lithiating tin, antimony and silicon, the volumetric expansion during the first charging cycle can be up to 300%. Upon releasing the lithium ions, the volume of the respective active materials decreases again, which causes high mechanical stresses within the particles made of active material and, as the case may be, to a shifting within the electrode structure. In some cases, the associated mechanical stress of the electrodes to a significant extent leads to contact losses between adjacent particles made of active material, which has an adverse effect on the capacity and the life cycle of the affected battery.

It could therefore be helpful to provide lithium ion batteries with improved aging performance, where the above problems do not occur or occur to a lesser extent.

SUMMARY

We provide a formed, secondary electrochemical cell including at least one positive electrode containing a metal compound capable of reversibly incorporating and releasing lithium in the form of ions, at least one negative electrode containing a carbon compound capable of reversibly incorporating or releasing lithium in the form of ions, and/or a metal and/or semi-metal which can be alloyed with lithium, an electrolytic via which lithium ions can migrate between the at least one positive electrode and the at least one negative, and mobile lithium available for incorporation or releasing processes in the electrodes, wherein capacity of the at least one negative electrode for taking up lithium is higher than that of the at least one positive electrode, the at least one negative electrode has a higher capacity than required for taking up the entire mobile lithium contained in the cell, and the mobile lithium is contained in the cell in an amount which exceeds the capacity of the at least one positive electrode for taking up lithium.

We also provide a battery including at least one electrochemical cell.

We further provide a method of producing the battery, wherein at least one positive electrode containing a metal compound capable of reversibly incorporating and releasing lithium in the form of ions, at least one negative electrode containing a carbon compound capable of reversibly incorporating or releasing lithium in the form of ions, and/or a metal and/or semi-metal which can be alloyed with lithium, and an electrolyte are combined to an electrochemical cell to form an electrochemical cell, wherein the at least one negative electrode in terms of its capacity for taking up lithium is dimensioned to a size greater than the at least one positive electrode, lithium is introduced into the cell in an amount exceeding the capacity of the at least one positive electrode for taking up lithium at least by a factor of 1.2, and the at least one negative electrode in terms of its capacity for taking up lithium is dimensioned to a size sufficient to be capable of taking up the entire lithium contained in the cell.

We further yet provide a method of producing an electrochemical cell including combining at least one positive electrode containing a metal compound capable of reversibly incorporating and releasing lithium in the form of ions, at least one negative electrode containing a carbon compound capable of reversibly incorporating or releasing lithium in the form of ions, and a metal or semimetal that can be alloyed with lithium, and an electrolyte to form an electrochemical cell, and subsequently subjected to a complete charge/discharge cycle, wherein the capacity of the at least one negative electrode for taking up lithium is dimensioned to a size exceeding a corresponding capacity of the at least one positive electrode at least by a factor of 1.2, lithium is introduced into the electrochemical cell such that an amount of mobile lithium contained in the cell available for incorporation and releasing processes in the electrodes exceeds, after formation, the capacity of the at least one positive electrode for taking up lithium at least by a factor of 1.1, and the at least one negative electrode in terms of its capacity for taking up lithium is dimensioned to a size sufficient to be capable of taking up the entire mobile lithium contained in the cell after formation, wherein the lithium is introduced at least partially into the electrochemical cell via the at least one negative electrode by pre-lithiating the at least one negative electrode prior to combination with the at least one positive electrode or by applying metallic lithium on a surface of the at least one negative electrode.

We also further provide a formed, secondary electrochemical cell, produced by the method of producing an electrochemical cell including combining at least one positive electrode containing a metal compound capable of reversibly incorporating and releasing lithium in the form of ions, at least one negative electrode containing a carbon compound capable of reversibly incorporating or releasing lithium in the form of ions, and a metal or semimetal that can be alloyed with lithium, and an electrolyte to form an electrochemical cell, and subsequently subjected to a complete charge/discharge cycle, wherein the capacity of the at least one negative electrode for taking up lithium is dimensioned to a size exceeding a corresponding capacity of the at least one positive electrode at least by a factor of 1.2, lithium is introduced into the electrochemical cell such that an amount of mobile lithium contained in the cell available for incorporation and releasing processes in the electrodes exceeds, after formation, the capacity of the at least one positive electrode for taking up lithium at least by a factor of 1.1, and the at least one negative electrode in terms of its capacity for taking up lithium is dimensioned to a size sufficient to be capable of taking up the entire mobile lithium contained in the cell after formation, wherein the lithium is introduced at least partially into the electrochemical cell via the at least one negative electrode by pre-lithiating the at least one negative electrode prior to combination with the at least one positive electrode or by applying metallic lithium on a surface of the at least one negative electrode including a composite of flat electrodes and a separator impregnated with the electrolyte, the at least one positive electrode containing a metal compound capable of reversibly incorporating and releasing lithium in the form of ions, the at least one negative electrode containing a carbon compound capable of reversibly incorporating or releasing lithium in the form of ions, and a metal or semimetal which can be alloyed with lithium, the electrolyte via which lithium ions can migrate between the at least one positive electrode and the at least one negative electrode, and mobile lithium available for incorporation or releasing processes in the electrodes, wherein the capacity of the at least one negative electrode for taking up lithium is at least by a factor of 1.2 higher than that of the at least one positive electrode, the at least one negative electrode has a higher capacity than required for taking up the entire mobile lithium contained in the cell, and the mobile lithium is contained in the cell in an amount which exceeds the capacity of the at least one positive electrode for taking up lithium at least by a factor of 1.1.

DETAILED DESCRIPTION

Figure 1B:
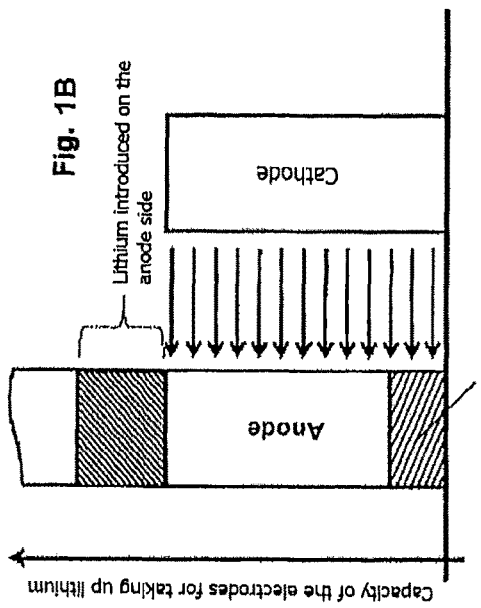
FIG. 1B shows in graph form the processes during the first charge of a cell of the electrodes from in FIG. 1A.

Our electrochemical cell is a secondary cell that is a rechargeable cell. Furthermore, the cell is a cell already formed, which in accordance with the above explanations is meant to designate that it has already undergone at least one complete charging/discharging cycle such that the described "solid electrolyte interphase" has already been generated and losses of lithium are only comparatively small in the subsequent cycles. Thus, a formed cell differs structurally from a non-formed cell. Thus, a formed cell is meant to designate in particular a cell where, due to the already occurred SEI generation during the first charge/discharge cycle, the losses of lithium in the cell during subsequent cycles are less than 0.5%, preferably less than 0.25%, in particular less than 0.1% (in each case, based on the available total amount of mobile lithium in the cell prior to the cycle).

The electrochemical cell comprises at least one positive electrode, at least one negative electrode, an electrolyte, and so-called "mobile lithium."

The at least one positive electrode contains at least one metal compound capable of reversibly incorporating and releasing lithium in the form of ions. In addition, it generally comprises at least one electrode binder, one conductivity additive as well as further additives, where appropriate. Suitable binders and additives are well-known.

Preferably, the at least one compound is a lithium metal oxide or a lithium metal phosphate compound, in particular a compound from the group consisting of $LiCoO_2$, $LiMn_2O_4$, $LiFePO_4$, $LiNi_{1/3}Mn_{1/3}Co_{1/3}O_2$, $LiMnPO_4$ or a mixture of two or more of those compounds.

The at least one negative electrode contains at least one carbon compound capable of reversibly incorporating or releasing lithium in the form of ions. However, alternatively or additionally, the at least one negative electrode can also contain at least one metal and/or semimetal which can be alloyed with lithium.

Besides the active materials, the at least one negative electrode generally comprises at least one electrode binder, one conductivity additive as well as further additives, where appropriate. Suitable binders and additives are known. A particularly preferred binder based on carboxymethyl cellulose is described in WO 2009/012899. The subject matter of that application is incorporated herein by reference.

As a carbon compound, the at least one negative electrode preferably contains a graphitic carbon compound. As a metal and/or semi-metal which can be alloyed with lithium, the electrode preferably contains at least one member from the group consisting of aluminum, silicon, antimony, tin and cobalt. As a mixture, a tin/antimony mixture or a tin-cobalt mixture is preferred, if applicable.

Particularly preferably, the at least one negative electrode contains a combination of the carbon compound capable of intercalation and the metal and/or semi-metal which can be alloyed with lithium, in particular as a mixture of graphitic carbon particles and silicon particles. The particles are preferably incorporated in a binder matrix made of a suitable carboxymethyl cellulose.

A composite electrode containing 20 weight percent (wt %) silicon and 60 wt % graphitic carbon as active materials as well as 20% electrochemically inactive materials (binder and conductivity additive) has a specific capacity of ca. 1060 Ah/kg [(4200 Ah/kg*0.2)+(372 Ah/kg*0.6)]. The capacity required for storing lithium can flexibly be adjusted by variation of the proportion of silicon without significantly increasing the mass of the required active material.

Via the electrolyte contained in the cell, lithium ions can migrate between the at least one positive electrode and the at least one negative electrode. Preferably, the electrolyte is a solution of a suitable conducting salt such as lithium hexafluorophosphate. As a solvent, preferably an organic solvent is used, in particular an ether or an ester compound of carbonic acid.

"Mobile lithium" is meant to refer to lithium available for incorporation and releasing processes in the electrodes. As described above, during formation of a secondary lithium ion cell, the aforementioned SEI is generated which inter alia also irreversibly binds a part (up to 35%, see above) of the lithium initially contained in the cell. The lithium is then no longer available for further charge/discharge reactions. In contrast, the "mobile lithium" is the proportion of lithium in the cell, which after formation is still available for reversible incorporation or releasing processes in the electrodes.

Our cell is particularly characterized by the following combination of features:
1. the capacity of the at least one negative electrode for taking up lithium is higher than that of the at least one positive electrode, 2. the at least one negative electrode has a higher capacity than would be required for taking up the entire mobile lithium contained in the cell, and
3. the mobile lithium is contained in the cell in an amount which exceeds the taking up capacity of the at least one positive electrode.

The combination of features will be explained in detail in the following, starting with Feature 1.

The first feature per se is not novel, since it is well-known to over-dimension negative electrodes in relation to the opposed positive electrodes to prevent that metallic lithium may deposit on the anode during charging. However, this is not an option in the case of our electrode anyway, since at the same time the at least one negative electrode is dimensioned to a size sufficient to take up all the mobile lithium contained in the cell (Feature 2). Overcharging the at least one negative electrode with lithium is therefore not possible. However, at the same time, there is more mobile lithium contained in the cell than can be taken up by the at least one positive electrode (Feature 3). In other words, our cell comprises a "storage" or a "pool" of mobile lithium by which the above described minor lithium losses occurring during operation even after formation can continuously be balanced. Therefore, the capacity and power of our cell remain stable over a higher number of cycles compared to known cells.

Preferably, the mobile lithium is contained in the cell in the form of lithium ions, but also, where applicable, in reduced metallic form. If the cell is completely charged, the lithium ions are essentially all incorporated in the at least one over-dimensioned negative electrode. During operation, they are distributed between the at least one negative electrode and the at least one positive electrode. The lithium can be present in reduced metallic form particularly when it is alloyed on the anode side with one of the aforementioned metals and/or semi-metals which can be alloyed with lithium. Also in this form it is available for reversible incorporation and releasing processes in the electrodes. When discharging the cell, the alloyed lithium can oxidize. The resulting lithium ions can then migrate to the cathode.

Preferably, the abovementioned capacity of the at least one negative electrode for taking up lithium exceeds the capacity of the at least one positive electrode by a factor of 1.2, preferably by a factor in the range between 1.4 to 2.5.

The capacity of the at least one negative electrode is preferably at least equal to the amount of the entire mobile lithium contained in the cell, particularly preferred it is higher by at least a factor of 1.05, preferably by a factor in the range between 1.1 and 2, than would be necessary for taking up the entire mobile lithium contained in the cell.

The amount of mobile lithium in the cell exceeds the capacity of the at least one positive electrode for taking up lithium preferably at least by a factor of 1.1, particularly preferred by a factor in the range between 1.2 and 2.

The mixing ratio between the carbon compound and the metal and/or semi-metal which can be alloyed with lithium in the negative electrode is preferably 20:1 to 1:20, particularly preferred 20:1 to 1:1, where appropriate (in each case referred to weight amounts used).

Likewise each battery comprises at least one electrochemical cell as described above. For example, a cell can be present in the form of a composite of flat electrodes and a separator impregnated with electrolyte. In our battery, such a composite is preferably present in a stacked-type arrangement or in a wound form.

To produce such a battery, in particular the method described below can be employed.

In the method, at least one positive electrode of the type described above, at least one negative electrode of the type described above, and an electrolyte as described above are combined into an electrochemical cell. The cell produced that way is subsequently formed, that is, subjected to at least one complete charge/discharge cycle.

In this case, the method is particularly characterized in that
  in terms of its capacity for taking up lithium, the at least one negative electrode is dimensioned greater than the at least one positive electrode,
  lithium is introduced in the cell in an amount exceeding the capacity of the at least one positive electrode for taking up lithium at least by a factor of 1.2, and
  in terms of its capacity for taking up lithium, the at least one negative electrode is dimensioned in a size sufficient to be capable of taking up the entire lithium contained in the cell after the formation.

In terms of preferred methods regarding the over-dimensioning of the at least one negative electrode in relation to the at least one positive electrode and regarding the amount of lithium, in particular mobile lithium, contained in the cell after the formation, reference is made to the above explanations related to our cell.

The amount of lithium introduced into the cell exceeds the capacity of the at least one positive electrode for taking up lithium preferably by a factor in the range between 1.2 to 2.

Preferably, the lithium is introduced into the cell at least partially via the at least one positive electrode. In particular, this can be achieved by using over-lithiated cathode materials. For example, over-lithiated oxidic compounds such as $LiNi_{0.425}Mn_{0.425}CO_{0.15}O_2$, represent a group of cathode materials, which during the first charge cycle can provide more lithium ions for the charging than they can reversibly lithiate or de-lithiate in the subsequent cycles. During the first charge process, a transfer of the excessive lithium ions into the over-dimensioned anode can be effected.

Another option for introducing lithium via the at least one positive electrode is to add metallic lithium to the at least one positive electrode, in particular passivated metallic lithium. For example, it is possible to passivate lithium particles by covering their surface with a thin layer of lithium phosphate, wax or a polymer layer. Suitable methods are described in WO 2008/143854, WO 2009/029270 and WO 2008/045557. The subject matter of WO '854, WO '270 and WO '557 is hereby incorporated herein by reference. Metallic lithium can be introduced in positive electrodes during its production in a relatively unproblematic manner since positive electrodes for lithium ion batteries are generally processed in a non-aqueous environment.

Another option for introducing lithium into the cell is to introduce the lithium at least partially via the electrolyte, in particular by using a conductive salt which can liberate lithium ions at the anode. Lithium azide ($LiN_3$) is an example of such a salt.

Further preferably, the lithium is at least partially introduced via the at least one negative electrode into the cell. This can be achieved by pre-lithiating the at least one negative electrode prior to combining the latter with the at least one positive electrode. In the simplest case, for example, the at least one negative electrode is connected against an electrode made of metallic lithium and charged. The charged at least one electrode is then subsequently connected against the at least one positive electrode.

Alternatively or additionally, an anode material can be used for the at least one negative electrode which contains a compound that can liberate lithium ions, in particular a transition metal nitride of the formula $Li_{3-x}M_xN$. Such a material promises high, stable and reversible capacities, however it stores within the structure more de-lithiatable lithium than it can reversibly incorporate or release. A disadvantage of the materials is mainly the lack of cycle stability and the high hydrolysis sensitivity (see Yu Liu, Kumi Horikawa, Maniko Fujiyosi, Nobuyuki Imanishi, Atsushi Hirano, Yasuo Takeda, Electrochemical Acta 49, 2004, 3487-3496 and Y. Takeda, M. Nishijima, M. Yamahata, K. Takeda, N. Imanishi, O. Yamamoto, Solid State Ionics 130, 1999, 61-69).

Another option for introducing lithium into the cell is the use of an electrode material containing the aforementioned metallic lithium, in particular the aforementioned passivated metallic lithium. Such particles can generally be admixed to both materials for negative and positive electrodes.

Where appropriate, passivated lithium can even be used in the production of electrodes processed in an aqueous environment. However, it is more advantageous to add metallic lithium to electrodes processed in an aqueous environment after their production, in particular after drying the electrodes. Thus, it can be preferred that metallic lithium is applied on the surface of a negative electrode processed in an aqueous environment after the latter has been dried, for example. Application of the metallic lithium can, for example, be effected by a foil which serves as a carrier for the aforementioned passivated lithium particles, and which can be laminary contacted to the surface of the electrode.

In the case of introduction on the anode side, the passivated lithium is already localized in the anode. Just as the lithium alloyed with the aforementioned metals and/or semi-metals, it can oxidize during operation and liberate lithium ions, which can migrate to the cathode. In the case of introduction on the cathode side, the passivated lithium is generally introduced in the above mentioned, additional capacity of the anode in the course of the first charge/discharge cycle of the cell.

A this point it is noted that all the aforementioned preferred procedures for introducing lithium into the cell can be used both on their own or in combination with other procedures.

As already mentioned, the predominant advantage of the described way of balancing electrodes of lithium ion batteries having high-capacitive anode materials is influencing the aging performance. Some other important advantages will be summarized in the following.

Since the at least one negative electrode has a higher, generally a significantly higher capacity than required to take up the entire mobile lithium contained in the cell, the high-capacitive anode materials preferably used, based on a mixture of silicon, tin, antimony or composites of the materials and carbon-based materials, are generally not completely lithiated. In this way, the materials are subject only to relatively small mechanic stresses during charge and discharge processes, thus preventing an irreversible inactivation of active material particles, which other-wise can lose electric contact to the electrode caused by high volume changes due to lithiation.

For electrodes containing silicon, this means that the highest lithiation level of silicon ($Li_{22}Si_5$) and the maximum achievable capacity of 4200 Ah/kg in connection thereto, is generally not reached during operation. Basically, for formation charging use of the silicon alloying capacity is possible within the range of 600 Ah/kg to 4200 Ah/kg. However, to generate the lithium pool, generally an amount of lithium is de-lithiated in the subsequent cycles which corresponds to a capacity value that is lower by 10 to 80%.

The standard values likewise apply to silicon which is processed to a composite electrode in combination with further active materials such as carbon compounds, metals or semi-metals such as tin, antimony and aluminum that can be alloyed with lithium.

Furthermore, the afore-described way of balancing the electrodes allows ensuring a higher discharge voltage of the battery. Due to the fact that the anode material is subjected to complete lithiation once, but subsequently never becomes completely de-lithiated, there is always remaining a lithium reserve in the anode, which is why the discharge voltage for the entire battery is higher in total.

Many cathode materials combined with high-capacitive anodes using conventional means, do not allow a complete de-lithiation of the lithium ions contained therein. Examples of such materials are host materials of the type $LiMO_2$ (M=Co, Ni). The most common of the cathode materials is lithium cobalt oxide having an $\alpha$-$NaFeO_2$ structure. As from a stoichiometry of $Li_{0.5}CoO_2$, the potential exceeds more than 4.2 V vs. $Li/Li^+$, followed by the liberation of oxygen, as well as a change in the structure from cubic to hexagonal. If and when mobile lithium is lost due to new SEI generation in cells balanced according to known methods, a further decisive aging process will occur. Since the switch-off criteria of the cell during charging are ensured by a nominal voltage of the battery, release of the additionally required amount of lithium from the cathode takes place, in case the amount of mobile lithium is too low. However, the additional lithium amount can only be achieved by going below the $Li_{0.5}CoO_2$ structure which is accompanied by the irreversible destruction of the lithiable form of the cathode active material. By generating a lithium pool in the cell, the occurrence of the aging effect can be prevented in that the losses of mobile lithium are counterbalanced by the lithium pool. There will be no falling below the $Li_{0.5}CoO_2$ structure of the cathode, until the lithium pool is exhausted.

Further features result from the following description of the drawings as well as preferred examples. In this case, individual features can in each case be realized on their own or in a combination with one another in an example. The described, preferred examples merely serve for explanation and a better understanding and are not to be understood as limiting in any way.

Figure 1D:
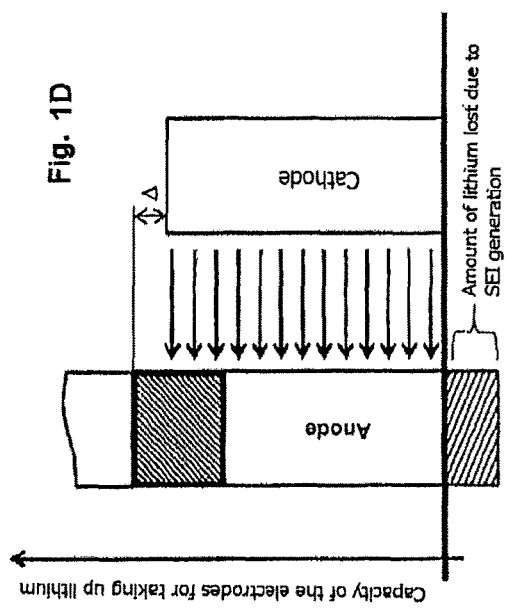
FIG. 1D graphically shows a charging procedure after formation.
Figure 1A:
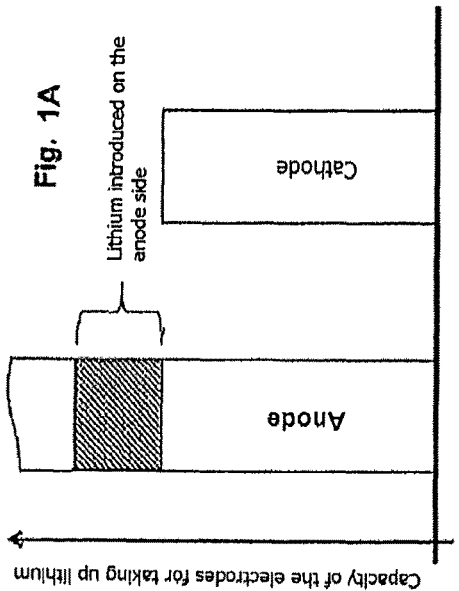
FIG. 1A schematically shows in a graph the principle of our cells and method.

The height of the columns shown in FIG. 1A corresponds to the capacities of the electrodes for an example of our cell. Furthermore, the lithium amount contained in the electrodes can be seen from the ordinate. The capacity of the anode (for example, containing a mixture of silicon and graphite as active material) is significantly greater than that of the cathode (for example, containing a lithium metal oxide compound such as lithium cobalt oxide as active material). The anode already contains an amount of lithium which was introduced in a previous step, for example, by admixing passivated lithium to the aforementioned active materials. The amount of lithium contained in the anode is shown in a hatched illustration. The total amount of lithium contained in the electrodes significantly exceeds the capacity of the cathode for receiving lithium.

In FIG. 1B, the cathode is de-lithiated during charging of the cell. Lithium ions are moved into the anode (in the direction of the arrow). A part of the lithium ions is consumed during generation of the SEI. The amount of the consumed lithium ions is shown on the anode side at the lower end of the column (see lower hatching). However, the amount of the consumed lithium ions is smaller than the amount of lithium introduced into the anode in the previous step (upper hatching).

Figure 1C:
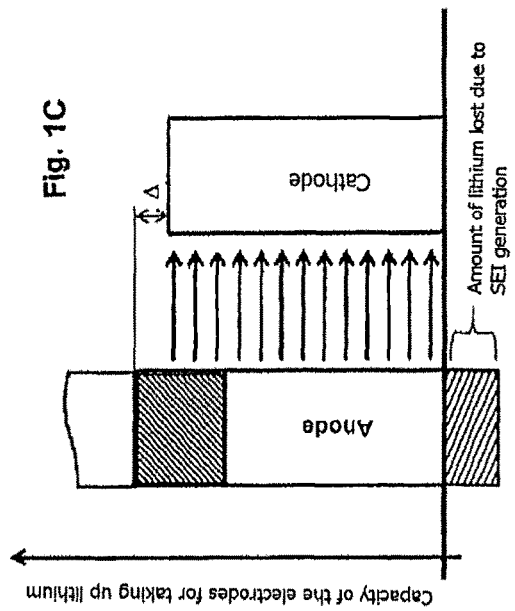
FIG. 1C graphically shows the lithium amount lost due to SEI generation.

In FIG. 1C, the lithium amount lost due to SEI generation is displaced below the abscissa since the amount of lithium ions is no longer available for the reversible charging or discharging of the cell. Shown is a discharge procedure subsequent to the charging illustrated in FIG. 1B. Since the lithium confined in the SEI can be compensated by the lithium introduced into the anode in the previous step, it is possible to recharge the anode completely with lithium ions. The difference 4 between the amount of lithium ions confined in the SEI and the amount of lithium introduced into the anode in the previous step remains as a lithium reserve in the anode.

In FIG. 1D, a charging procedure is shown after completed formation. If there is a further loss of lithium ions, the ions are replaced using the lithium reserve. Not before the lithium reserve is exhausted, the amount of lithium available for incorporation and releasing procedures will decrease.

Figure 2A:
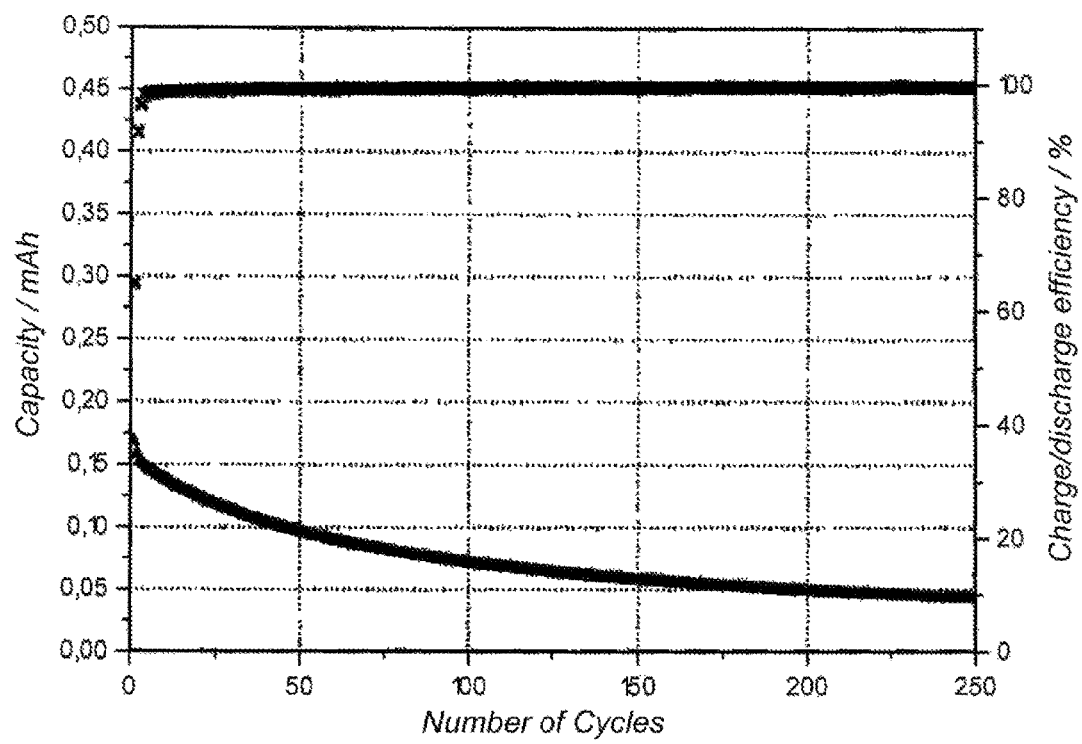
FIG. 2A graphically shows discharge capacities of a first example of a battery.

FIG. 2A shows the discharge capacities (lower curve) of a first example of a battery as well as the efficiencies of charge capacity in relation to discharge capacity as a function of the number of cycles. The first battery serves as a reference for an example of our battery.

The anode of the first battery was produced from a paste including 8 wt % sodium carboxymethyl cellulose, 10 wt % of a conductivity additive (a mix of conductive carbon black and carbon nanofibers), as well as 20 wt % silicon (medium particle size 30-50 nm) and 62 wt % of a graphitic carbon. Water was used as process solvent (4 g water relative to 1 g electrode material). The paste was applied as a thin layer onto a cupper foil serving as current collector.

The cathode of the first battery consisted of a thin layer of electrode material which was applied onto an aluminum foil likewise serving as a current collector. When producing the cathode, a cathode paste consisting of 5 wt % of a polymer binder based on polyvinylidene fluoride-hexafluoropropylene, 7 wt % of a conductivity additive (conductive carbon black) as well as 88% $LiCoO_2$ as electrochemically active material. As process solvent, N-methyl-2-pyrrolidone was used (5 g N-methyl-2-pyrrolidone relative to 4 g electrode material).

An organic electrolyte was used as electrolyte which contained electrolyte solvents on a carbonate basis and lithium hexafluorophosphate as conductive salt.

The capacity of the anode was 0.393 mAh (at a specific capacity of approximately 1070 mAh/g). The capacity of the cathode was 0.240 mAh. The cell was controlled via the cell voltage and charged and discharged in the range of 3 V and 4.2 V, wherein the nominal cell capacity was 0.240 mAh. Two cycles with 0.1 C and consecutive cycles with 0.5 C were performed, wherein 1 C corresponded to a current of 0.240 mA. As additional conditions, the cathode was operated up to a maximum voltage of 4.2 V and the anode was operated up to a maximum voltage of 1.5 V.

Figure 2B:
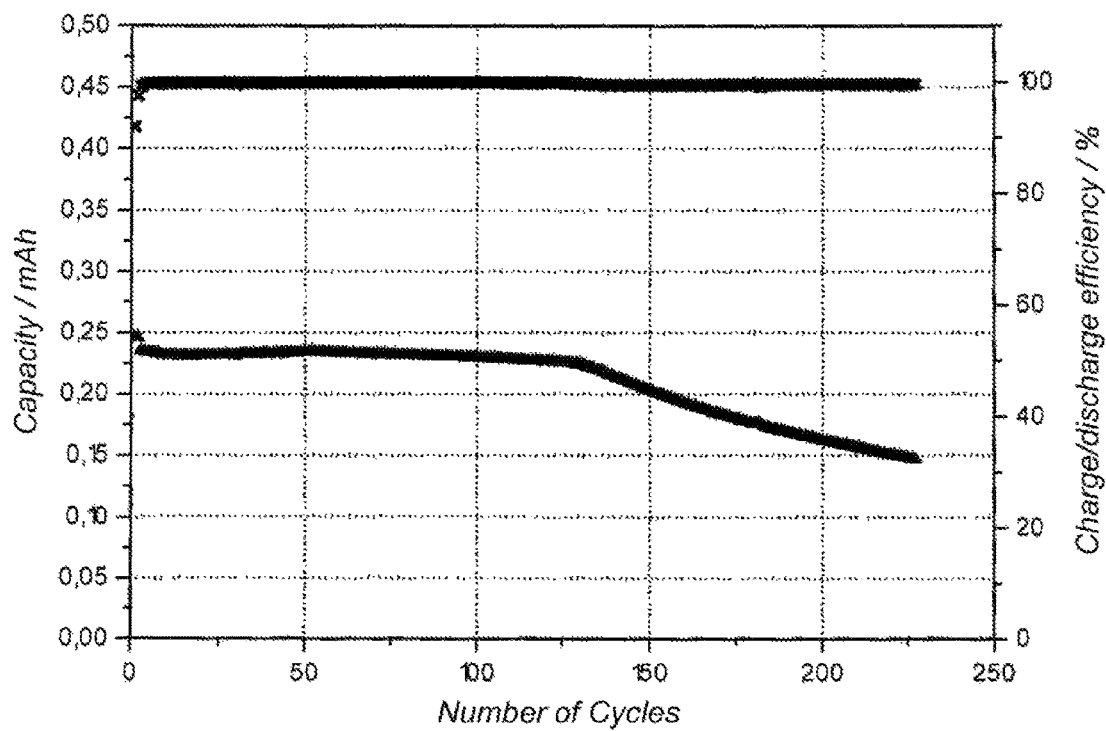
FIG. 2B graphically shows discharge capacities of a second example of a battery.

FIG. 2B shows the discharge capacities (lower curve) of another example of our battery as well as the efficiency of the charge capacity in relation to the discharge capacity depending on the number of cycles.

Also in this case, the anode was produced from a paste including 8 wt % sodium carboxymethyl cellulose, 10 wt % of a conductivity additive (a mix of conductive carbon black and carbon nanofibers), as well as 20 wt % silicon (medium particle size 30-500 nm) and 62 wt % of a graphitic carbon. Water was used as process solvent (4 g water in relation to 1 g electrode material). The paste was applied as a thin layer onto a copper foil serving as current collector.

However, in contrast to the first battery example, a lithium pool was formed in the anode by switching the anode against an electrode made of metallic lithium and by charging the anode to 70% of the maximum capacity of approximately 1250 mAh/g. Only after the pre-lithiation, the anode was combined with the corresponding cathode.

To produce the cathode, as in the case of the first battery example, a paste consisting of 5 wt % of a polymer binder based on polyvinylidene fluoride-hexafluoropropylene, 7 wt % of a conductivity additive (conductive carbon black) as well as 88% $LiCoO_2$ as cathode material was employed. The paste was applied onto an aluminum foil serving as current collector, and formed a thin electrode layer thereon after drying. As process solvent, N-methyl-2-pyrrolidone was used (5 g N-methyl-2-pyrrolidone relative to 4 g electrode material).

An organic electrolyte was used as electrolyte which contained electrolyte solvents on a carbonate basis and lithium hexafluorophosphate as conductive salt.

The pre-lithiated anode had a capacity of 0.404 mAh (at a specific capacity of around 1070 mAh/g). It was combined with the cathode which had a capacity of 0.253 mAh. The cell thus produced was controlled via the cell voltage and charged and discharged within the boundaries of 3 V and 4.2 V, respectively, wherein the nominal cell capacity was 0.253 mAh. Two cycles with 0.1 C and consecutive cycles with 0.5 C were performed, wherein 1 C corresponded to a current of 0.240 mA. For additional conditions, the cathode was operated up to a maximum voltage of 4.2 V and the anode was operated up to a maximum voltage of 1.5 V.

Despite identical components, the first battery example and the second battery example exhibited completely different performances, as can be seen from FIG. 2A and FIG. 2B. Generation of a lithium pool in the anode significantly delayed the aging of the second battery.

The invention claimed is:

1. A method of producing an electrochemical cell comprising combining
    at least one positive electrode containing a metal compound capable of reversibly incorporating and releasing lithium in the form of ions,
    at least one negative electrode containing a carbon compound capable of reversibly incorporating or releasing lithium in the form of ions, and a metal or semimetal that can be alloyed with lithium, and
    an electrolyte to form an electrochemical cell comprising a composite of flat electrodes and a separator impregnated with the electrolyte, and subsequently subjected to a complete charge/discharge cycle, wherein
    the capacity of the at least one negative electrode for taking up lithium is dimensioned to a size exceeding a corresponding capacity of the at least one positive electrode at least by a factor of 1.2,
    lithium is introduced into the electrochemical cell such that an amount of mobile lithium contained in the cell available for incorporation and releasing processes in the electrodes exceeds, after formation, the capacity of the at least one positive electrode for taking up lithium at least by a factor of 1.1,
    the at least one negative electrode in terms of its capacity for taking up lithium is dimensioned to a size sufficient to be capable of taking up the entire mobile lithium contained in the cell after formation, and
    the lithium is introduced at least partially into the electrochemical cell via the at least one negative electrode by pre-lithiating the at least one negative electrode prior to combination with the at least one positive electrode or by applying metallic lithium on a surface of the at least one negative electrode.

2. The method according to claim 1, wherein the at least one negative electrode con-tains graphite as the carbon compound capable of reversibly incorporating or releasing lithium in the form of ions, and silicon as the metal or semimetal which can be alloyed with lithium.

3. The method according to claim 1, wherein the mixing ratio between the carbon compound and the metal and/or semi-metal which can be alloyed with lithium in the negative electrode is 20:1 to 1:20.

4. The method according to claim 1, wherein the capacity of the at least one negative electrode for taking up lithium is dimensioned to a size exceeding the corresponding capacity of the at least one positive electrode by a factor of 1.2 and 2.

5. The method according to claim 1, wherein the lithium is introduced into the cell in an amount exceeding, after formation, the capacity of the at least one positive electrode for taking up lithium by a factor of 1.2 and 2.

6. A formed, secondary electrochemical cell, produced by the method according to claim 1, comprising:
   a composite of flat electrodes and a separator impregnated with the electrolyte,
   the at least one positive electrode containing a metal compound capable of reversibly incorporating and releasing lithium in the form of ions,
   the at least one negative electrode having been pre-lithiated before forming the flat composite electrodes or metallic lithium having been applied on a surface of the at least one negative electrode,
   the at least one negative electrode containing a carbon compound capable of reversibly incorporating or releasing lithium in the form of ions, and a metal or semimetal which can be alloyed with lithium,
   the electrolyte via which lithium ions can migrate between the at least one positive electrode and the at least one negative electrode, and
   mobile lithium available for incorporation or releasing processes in the electrodes, wherein
   the capacity of the at least one negative electrode for taking up lithium is at least by a factor of 1.2 higher than that of the at least one positive electrode,
   the at least one negative electrode has a higher capacity than required for taking up the entire mobile lithium contained in the cell, and
   the mobile lithium is contained in the cell in an amount which exceeds the capacity of the at least one positive electrode for taking up lithium at least by a factor of 1.1.

7. The electrochemical cell according to claim 6, wherein the cell contains the lithium in the metallic form.

8. The electrochemical cell according to claim 6, containing the metallic lithium on the surface of the at least one negative electrode.

9. A battery comprising at least one electrochemical cell according to claim 6.

* * * * *